Figure 1:
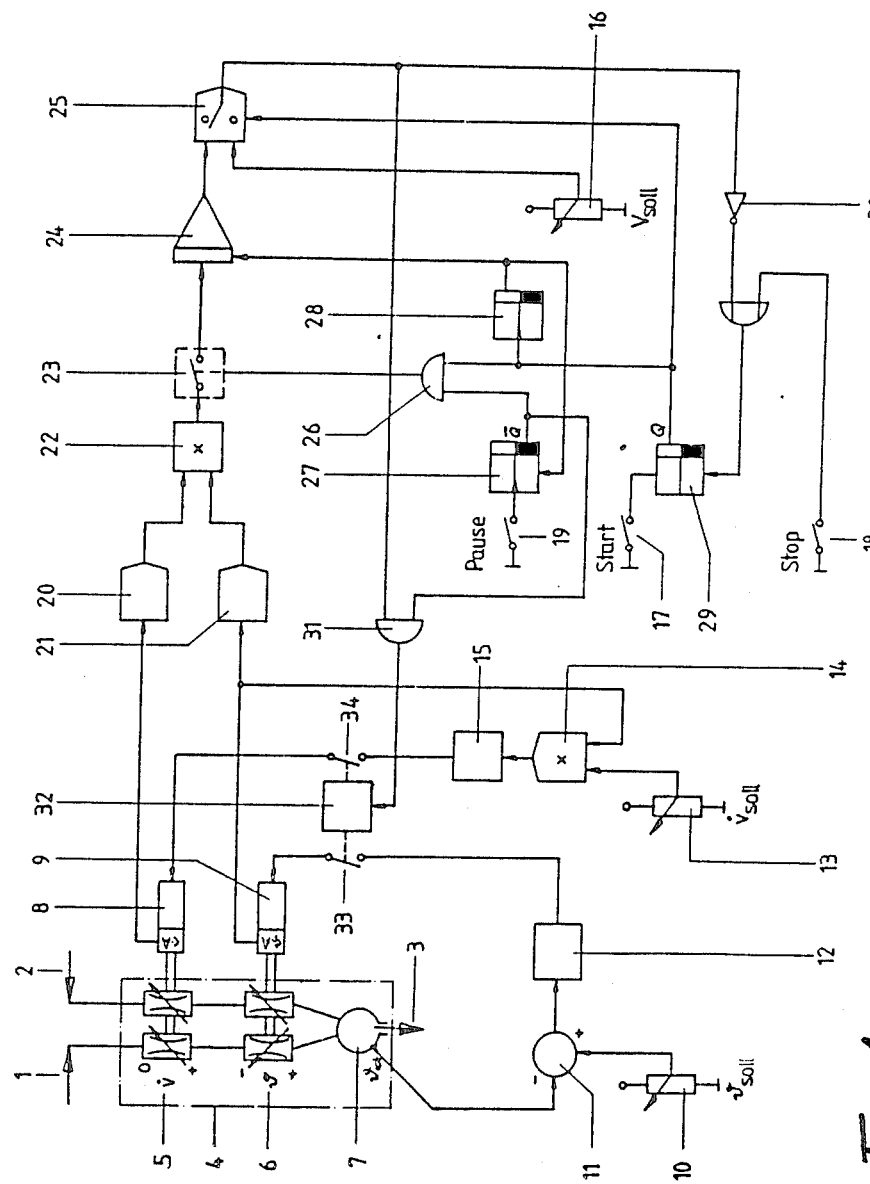

United States Patent [19]

Knebel et al.

[11] Patent Number: 4,694,512

[45] Date of Patent: Sep. 22, 1987

[54] PLUMBING MIXING CIRCUIT CONTROL APPARATUS FOR A COMBINATION SET

[75] Inventors: Werner Knebel, Iserlohn; Günter Sieberhagen, Hagen, both of Fed. Rep. of Germany

[73] Assignee: Knebel & Rottger GmbH & Co., Fed. Rep. of Germany

[21] Appl. No.: 870,818

[22] Filed: Jun. 5, 1986

[30] Foreign Application Priority Data

Feb. 9, 1985 [DE] Fed. Rep. of Germany ....... 3531294

[51] Int. Cl.$^4$ ................................................ E03C 1/04
[52] U.S. Cl. .......................................... 4/192; 4/191;
4/661; 4/DIG. 3; 4/598
[58] Field of Search ................. 4/192, 191, 559, 598,
4/538, 545, 661, 623, DIG. 3, 194, 305, 304;
137/487.5, 468, 429, 392, 426; 219/328, 497

[56] References Cited

U.S. PATENT DOCUMENTS

| | | | |
|---|---|---|---|
| 2,908,017 | 10/1959 | Whaley | 4/192 X |
| 3,638,680 | 2/1972 | Kopp | 4/192 X |
| 4,189,792 | 2/1980 | Veach | 4/192 |
| 4,409,694 | 10/1983 | Barrett, Sr. | 4/598 |
| 4,554,688 | 11/1985 | Puccerella | 4/661 |
| 4,563,780 | 1/1986 | Pollack | 4/559 X |
| 4,651,777 | 3/1987 | Hardman | 4/DIG. 3 |
| 5,606,085 | 8/1986 | Davies | 4/192 |

Primary Examiner—Henry K. Artis
Attorney, Agent, or Firm—Jacobs & Jacobs

[57] ABSTRACT

In order to achieve a fully automatic, electronic adjustment by means of a process for controlling a plumbing combination set with a multi-disc mixing valve for hot and cold water, whereby temperature is adjusted by making a comparison between the actual temperature of the mixing water and the target temperature of the mixing water, it is proposed that the actual mixing value be constantly measured and that a factor for the regulator of the appropriate mixing valve adjustment disc be derived from the target/actual divergence, and that at the same time the preselected flow of the mixture can be maintained at a constant level without measurement of the flow quantities, a correction factor being derived from the factor of the aforementioned adjustment disc for the factor of the flow adjustment disc regulator.

19 Claims, 3 Drawing Figures

PLUMBING MIXING CIRCUIT CONTROL APPARATUS FOR A COMBINATION SET

The invention concerns a process for regulating a combination set with a multi-disc mixing valve, in particular a combination set for plumbing, for two streams of liquid, particularly hot and cold water, in which by means of a comparison between a measuring factor for the mixing, particularly between the actual temperature of the mixing water, and a preselected target factor, particularly the target temperature of the mixing water, an adjustment, and particularly a temperature adjustment, is made.

Regulated combination sets are known for household purposes and for plumbing installations, in which a piston valve is slid in axial direction from an extension element which controls a hot water inlet and a cold water inlet duct in the set housing in the opposite direction. By limiting from outside the extension path of the extension element through the use of a graduated handle, the mixing water temperature is predetermined. The quantity is regulated independently by means of a level or rotating handle that can be turned from outside, whereupon the hot and cold water inlets can be jointly opened or closed. The disadvantages of such systems are the slowness of the adjustment system and the resulting imprecision of adjustment.

Starting from this state of the art, the invention aims to create a process for fully automatic and electronic control of mixing fixtures, by means of which process a mixture and quantity control can be achieved in a simple manner and in a way that will function safely, with precision, and rapidly. In addition, this process should make possible the automatic adjustment of a cumulative load that can be preselected.

According to the invention, the aim is achieved by means of continuous measurement of the actual amount of the mixture and derivation from the target/actual divergence of a factor for the regulator of the appropriate adjustment disc of the mixing valve, simultaneous with unvarying maintenance of the preselected flow quantity of the mixture without measurement of the flow, with a correction factor being derived from the factor of the aforementioned adjustment disc for the factor of the regulator of the flow adjustment disc.

By means of this process, on the one hand, a fully automatic, electronic, precise and rapid mixing adjustment that functions reliably is achieved. It is at the same time ensured, through derivation of the correction factor from the factor of the mixture adjustment disc for the factor of the flow adjustment disc regulator, that the total flow will remain at a constant level. It is hereby possible to establish a filling quantity and to achieve this predetermined filling quantity precisely. In contrast to previously customary systems, the continuous adjustment of the mixture ratio does not influence the amount of flow, since the total flow quantity is continuously adjusted according to the adjustment of the mixture ratio. It is preferable to provide for temperature regulation by means of an adjustment disc.

The process of regulating temperature and quantity in a combination set is suitable for this purpose.

The temporary cumulative filling quantities of the mixture are determined continuously from the factors for mixture (temperature) and flow adjustment, which factors can be temporarily varied; when a preselected filling quantity is reached the factor of the flow adjustment regulator is placed at zero, whereupon the inflow of the two fluids is interrupted. What is thereby achieved is that the cumulative filling quantity is maintained at precisely the preselected figure, with interruption of the inflow of the two fluids once the filled line is reached and the factor is returned to zero.

The term two fluids refers in particular to the cold and hot water inflows.

It is advantageous if at the start of the procedure for determining the cumulative filling quantity a start is made on determining the factor.

When a value for the cumulative filling quantity is achieved that is identical with the previously indicated cumulative filling quantity, the process for determining the cumulative filling quantity is terminated.

It is further advantageous if the filling procedure is interrupted by activation of a pause key and the value of the filling quantity of the mix water at that moment is stored, the filling procedure being then resumed by activation of the pause key, with due consideration for the stored value of the cumulative filling quantity of the mix water.

If an interrupted filling procedure is not to be continued, the cumulative filling quantity of the mix water that has been temporarily stored is then wiped out by the initiation of a new filling procedure, and the pause function is thereby eliminated.

Preferably, standard figures for the mixture, particularly the target temperature, the flow quantity, and the cumulative filling quantity of the mixing water are stored. The factors relevant to these figures, and previously stored, are also stored in such manner that they can be called up. This makes it possible, for example, to adjust the standard temperature, standard filling quantity, and flow quantity merely by pressing a key, without any need to select them individually, by activating the valve, for the purpose of filling a bathtub.

Provision can also be made for maintaining the preselected flow at a constant level and drawing the preselected filling quantity by directly measuring the flow.

In the solution described at the beginning, precise functioning requires equal entry pressures at the cold water and hot water inlets as a necessary condition. In order to achieve the aim of the invention even if the entry pressures are unequal, it is proposed that the correction factor for the factor of the flow adjustment disc regulator, which said correction factor serves to maintain the flow at a constant level, be derived from the influence of the differential pressures between each one of the minimum of two fluid inflows and mixing flow outflow, particularly between the hot water inflow and the mixing water outflow and between the cold water inflow and the mixing water outflow, whereupon the influence of the mixture adjustment disc factor is if necessary taken into consideration in conjunction with the influence of the differential pressures as a control amount for the correction factor.

In this way the entry pressure in the area of the two inflows of the fixture is taken into consideration and used as a factor for the flow adjustment disc. The result is a very precise, fully automatic adjustment, particularly as regards the filling quantity.

The circuit layout according to the invention is characterized by:

a. An adjustment circuit to adjust the mixture ratio, particularly the mixing water temperature, a factor for the regulator that engages in the mixture adjustment disc, in particular the temperature adjustment disc, being obtained with this adjustment circuit after comparison of the actual mixture, particularly the actual temperature, with the target mixture, particularly the target temperature, in a subtractor by means of an adjustment algorithm;

b. An adjustment circuit to maintain the flow at a steady level, with which circuit a factor for the regulator that engages in the flow adjustment disc is derived out of the target flow by means of a signal transformer;

c. A correction of the factor for the regulator based on the factor for the regulator, in such manner that the corrected factor for the regulator is computed by a function generator.

Further developments are described in the subclaims.

Figure 2:
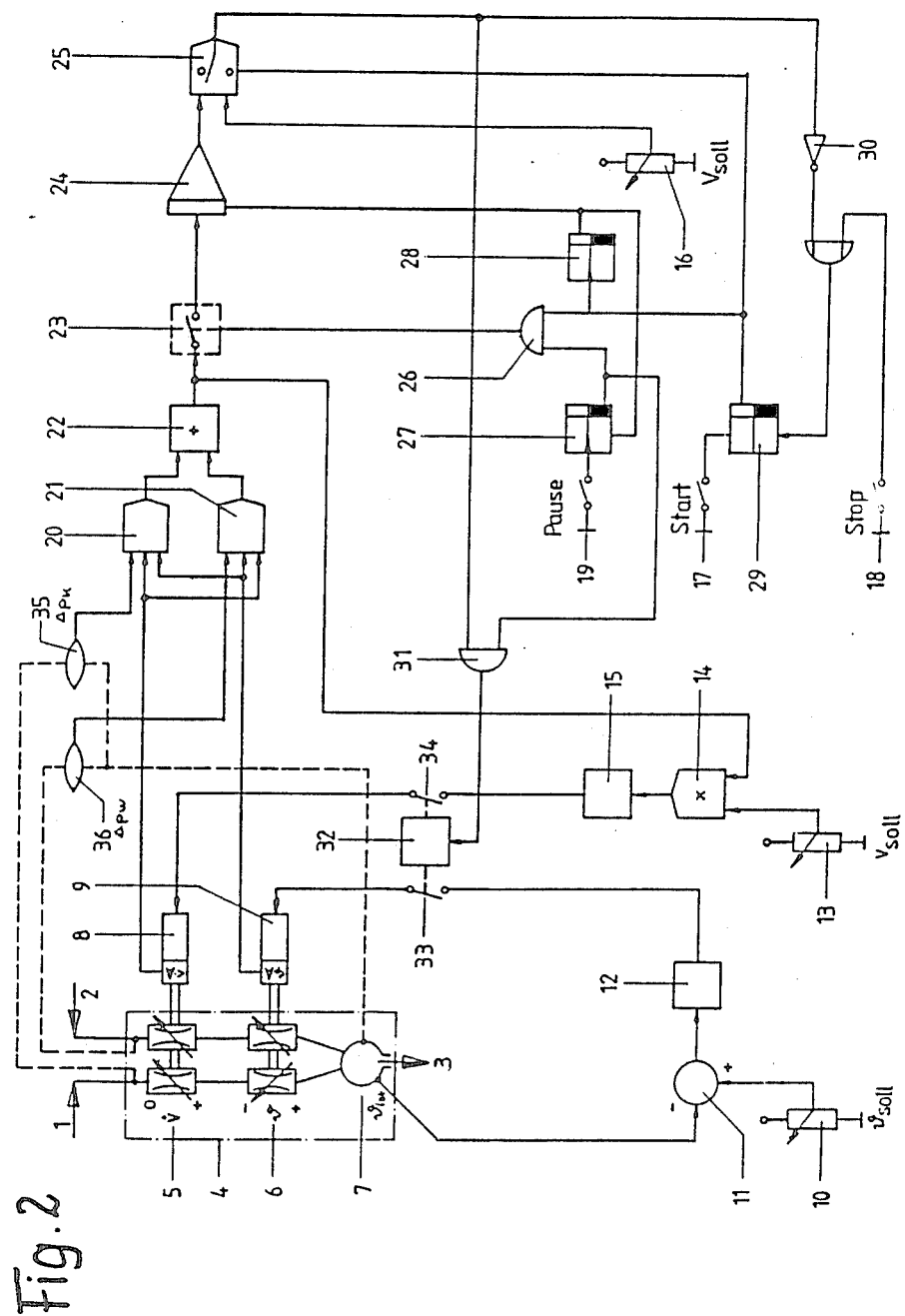
Figure 3:
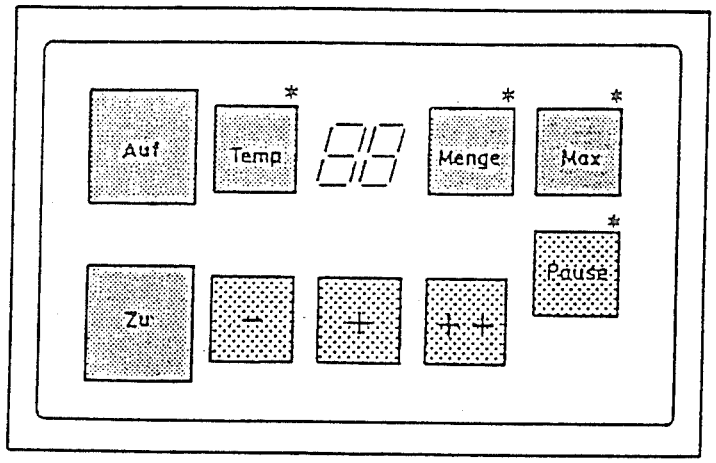

The invention is explained in greater detail below by means of schematic drawings showing:

FIG. 1 A control circuit for performing the process of the invention;

FIG. 2 A further developed variant in the same representation;

FIG. 3 A chart for using the circuit layout.

In the embodiment represented in FIGS. 1 and 2, a mixing valve 4 of a plumbing combination set is shown in diagrammatic form with a cold water inlet 1, a hot water inlet 2, and a mixing water outlet 3. The mixing valve of the plumbing combination set is constructed in a known manner as a multi-disc mixing valve having several ceramic discs positioned one on top of another for the control of the flow and temperature adjustment. The flow adjustment 5 is done by a first adjustment disc, the temperature adjustment 6 is done by a second adjustment disc. The mixing chamber is designated as 7. A regulator 8, which can for example be an electro-motor regulator, blocks the adjustment disc 5 for the purpose of regulating the flow. Similarly, the temperature is regulated with the help of a regulator 9, which can move the appropriate adjustment disc translationally or rotationally. This regulator too can be driven by an electro-motor.

The temperature in the mixing chamber 7 constitutes the actual temperature, which is detected and read in the subtractor 11. In addition, the target temperature is read by a target-figure potentiometer 10 in the subtractor. When there are temperature divergences between the target figure and the actual figure, a control signal 12 is given on the PID controller to regulator 9, which performs the appropriate adjustment procedure relative to the temperature adjustment disc.

Provision is made for another target-figure potentiometer 13 for the flow, by means of which the quantity of flow can be adjusted. The adjusted target figure is read in the function generator 14, whereupon an adjustment value derived by the temperature adjuster regulator is also read into this function generator 14. This signal is read by the function generator into a signal modulator 15, which in turn controls the flow adjustment regulator 8. The position of regulators 8 and 9 at that moment is transferred to function generator 20 or 21, which position is in turn conducted to a multiplier (in FIG. 1) or an adder 22 (in FIG. 2).

The output signal of the multiplier or adder 22 passes through an analog switch 23 into an integrator 24 and subsequently into a comparator 25.

The function generator 14 described above computes a factor for the quantity valve based on the adjusted flow quantity and the position of the mixing valve. The function generator 21 serves to accept from the factor generator of the mixing valve, based on the position of the mixing valve, a signal for the temporary valve adjustment, and to derive via the function generator 21 a corrected figure for the flow, corresponding to the characteristic valve line, which figure can range between a lower limit and the upper limit of 1.

In function generator 20, a signal is derived from the factor generator for the quantity valve, based on the position of the quantity valve and a value is derived from the function generator 20 corresponding to its characteristic valve line, which said value is in proportion to the temporary flow.

In multiplier 22 according to FIG. 1, an appropriate figure for the temporary total flow is created out of the two corrected figures for the flow, by means of multiplication. The function of adder 22 according to FIG. 2 leads essentially to a similar result. The analog switch 23 is used to interrupt the analog figure for the total flow when pause key 19 is pressed, which will be explained in greater detail below. Integrator 24 adds the flow quantity signal, which is at the inlet and can be temporarily changed, via the opening time, to a cumulative filling quantity. Comparator 25 compares the two entry signals, cumulative filling quantity, and maximum filling quantity and interrupts the internal circuit if the cumulative filling quantity is larger than the maximum filling quantity. The maximum filling quantity is read via a target-figure potentiometer 16 in the comparator 25.

The combination set is activated by a start key 17 or a stop key 18 and also a pause key 19. The start key 17 controls a start/stop flip-flop 29, as does stop key 18. When the start key 17 is activated, flip-flop 29 is activated and with the help of an AND gate 26 of analog switch 23 is closed so long as pause key 19 is not activated. Through this process the integration process can be place in the integrator 24. At the same time, at the start of the integration process the reset input of integrator 24 can be activated for a short time by means of a monostable flip-flop 28, and the starting figure of the integration can thereby be set at zero.

By means of an inverter 30 and an OR gate, the comparator 25 controls the start/stop flip-flop, with inverter 30 deactivating (reversing) the start flip-flop 29 when the internal switch of the comparison circuit 25 is opened.

By means of stop key 18, even before the adjusted cumulative filling quantity is reached by deactivation of start flip-flop 29 the flow can be interrupted. For this purpose the signal travels from stop key 18 through an OR gate that is also controlled by inverter 30 and the output of which controls the start/stop flip-flop 29.

Pause key 19 controls a pause flip-flop that is placed in opposite condition each time that pause key 19 is operated. This means press once: pause; press again: release; etc.

When start key 17 is pressed, the pause flip-flop 27 is brought to a stop by monostable flip-flop 28. The inverted output of pause flip-flop 27 adjusts control circuit 32 through an AND gate 31. The control circuit is also adjusted by the same AND gate 31 via the output of comparator 25. The AND gate 31 ensures that when the pause key is pressed the control circuit for the valve is broken in the same way as for the intended interruption by means of comparator 25. By means of the control circuit, the interruption circuits 33, 34 installed between the signal PID controller 12 and regulator 9, or between signal converter 15 and regulator 8, are adjusted.

The analog switch 23 is used to interrupt the analog figure for the total flow when pause key 19 is pressed. When pause flip-flop 27 is activated, the input of the AND gate is closed, so that analog switch 23, and hence the integration process, is interrupted.

AND gate 26, which is controlled by the inverted output of pause flip-flop 27 and by the non-inverted output of start flip-flop 29, causes analog switch 23 to be closed only when start/stop flip-flop 29 is activated and pause flip-flop 27 is deactivated.

The embodiment according to FIG. 2 differs essentially from the embodiment according to FIG. 1 only in that in addition to the measuring figures for flow and mixture ratio the pressure ratios are recorded and are used for adjustment or control.

By means of the circuit layout according to FIG. 2, automatic adjustment is thus possible independent of the entry pressure at cold water inlet 1 and at hot water inlet 2. In addition, in each case the differential pressure between cold water inlet 1 and mixing water outlet 3 is recorded by means of a differential pressure sensor 36, or the differential pressure between the hot water inlet 2 and mixing water outlet 3 is recorded by means of a differential pressure sensor 35. The differential pressures are read into the function generator 20 or 21, in addition to the factors for regulators 8 and 9, whereupon the outputs of function generators 20 and 21 are read into an adder 22, which in turn is closed on the output side to integrator 24. Alternatively, an analog switch 23 according to FIG. 1 is connected up between adder 22 and integrator 24. The figure determined by adder 22 is in addition read into function generator 14, and is thus taken into consideration in the adjustment of regulator 8 for flow control.

The control proposed by the invention facilitates easy use that is particularly appropriate for household purposes, as represented in an example in FIG. 3. Determination of the factors is initiated by pressing the "On" or "Off" keys. The temperature can be adjusted upward or downward appropriately by pressing the "Temp" and "Plus" or "Minus" keys. Adjustment of the flow quantity is regulated in a similar manner. If very high temperatures should be desired, which is not generally the case, the "Plus-Plus" key is pressed. The "Max" key is provided for maximum cumulative filling quantities, e.g. for a full bath. The "Pause" key allows interruption of a filling process that is underway. A digital display for displaying the numerical values existing at a given moment is provided between the "Temp" and "Quantity" keys. Keys designated by a "*" are constructed preferably in the form of luminous diodes.

The invention is not limited to the examples of embodiments, it can be varied in numerous ways within the framework of the disclosure.

All new individual and combination characteristics disclosed in the description and/or drawings are deemed essential to the invention.

What is claimed is:

1. Plumbing mixing circuit control apparatus for controlling a plumbing combination set comprising a multi-disc mixing valve for two streams of hot and cold water or other fluids, to make a temperature adjustment by a comparison between a measurement figure for the mixture such as the actual temperature of the mixing water or fluids, and a preselected target figure which is the target temperature of the mixing water, wherein the actual value for the mixture is continuously measured and a factor for the regulator of the appropriate mixing valve adjustment disc is derived from the target/actual divergence, and at the same time the preselected flow quantity of the mixture can be maintained at a constant level without measurement of the flow quantities, such correction figure being derived from the said adjustment disc for flow control of the disc regulator, said plumbing mixing circuit control apparatus further comprising at least one mixture adjustment disc and at least one temperature adjustment disc; each at least one said disc having a regulator engaged therewith, substractor means for an adjustment algorithm;

adjustment circuit means for maintaining liquid flow at a steady level, said circuit constituting a factor that the regulator which engages the flow adjustment disc, said factor being derived from the target flow by a signal transformer in communication therewith and a function generator communicating with said regulator for computing a regulated corrective factor.

2. The plumbing mixing circuit control apparatus of claim 1, wherein one control disc is adjustable for temperature control.

3. The plumbing mixing circuit control apparatus of claim 1, wherein the cumulative filling quantity of the mixture at a given moment is determined continuously from the temporarily variable factors for mixture (temperature) and flow adjustment, and when a predetermined filling quantity level is reached at least the value for the flow adjustment regulator is set at zero to interrupt the inflow of both fluids.

4. The plumbing mixing circuit control apparatus of claim 3, wherein upon initiation of the process for determining the cumulative filling quantity the process of determining the factors is initiated at the same time.

5. The plumbing mixing circuit control apparatus of claim 1, wherein by pressing a pause key the filling process is interrupted and the value for the filling quantity of the mixing water at that moment is stored, and pressing the pause key again to continue the filling process with relation to the stored figure for the cumulative filling quantity of the mixing water.

6. The plumbing mixing circuit control apparatus of claim 5, wherein upon initiation of a new filling process the stored value for the cumulative filling quantity of the mixing water at a given moment is cancelled.

7. The plumbing mixing circuit control apparatus of claim 5, wherein upon obtaining a value for the cumulative filling quantity that is equal to a preselected cumulative filling quantity, the process of determining the cumulative filling quantity is terminated.

8. The plumbing mixing circuit control apparatus of claim 1, wherein standard values for target temperature, flow quantity, and cumulative filling quantity of the mixing water or fluids and the predetermined factors relevant to these values are stored in such manner that they can be recalled.

9. The plumbing mixing circuit control apparatus of claim 1, wherein the preselected flow quantity is maintained at a constant level and the preselected filling quantity is drawn by means of a direct measurement of the flow quantity.

10. The plumbing mixing circuit control apparatus of claim 1, wherein the correction figure for the flow control disc regulator factor, which said correction figure serves to maintain the flow at a constant level, is derived from the influence of the differential pressures between each one of the fluid inflows, of which there are at least two, and the mixing fluid outlet, between the hot water inflow and the mixing water outflow, under the influence of the mixing adjustment disc factor if necessary to be taken into consideration in conjunction with the influence of the differential pressure as magnitude control for the correction value.

11. The plumbing mixing circuit control apparatus of circuit according to claim 1, in which a PID controller is installable as an adjustment algorithm.

12. The plumbing mixing circuit control apparatus of claim 1, in which there is provided, in order to determine the cumulative filling quantity at any given moment:
  (a) a correction value for the flow quantity is derived, based on the regulator factor, by means of the function generator;
  (b) a value for the flow quantity corresponding to the characteristic value line by the function generator based on the regulator factor;
  (c) an appropriate value for the total flow quantity at any given moment is created by means of a multiplier from the values derived in "a" and "b"; and
  (d) the temporarily variable output signals of the multiplier are totalled by means of an integrator to form a cumulative filling quantity value at a given moment.

13. The plumbing mixing circuit control apparatus of claim 1 for terminating filling based on an automatic target filling quantity:
  (a) whereby the cumulative filling quantity signal at a given moment is compared with the target (maximum) filling quantity in a comparator;
  (b) whereupon achieving a cumulative filling quantity at any given moment, which quantity corresponds to the target filling quantity, a start/stop flip-flop is reversed via an inverter, whereby the actuating drive is interrupted and reversed (to 0) by means of a signal circuit and interruption switch to bring about termination of the filling process.

14. The plumbing mixing circuit control apparatus of claim 13, wherein there is provided a stop key which upon activation enables the start-stop flip-flop to be reversed (deactivated), whereby the filling process can thereby be interrupted even before the target filling quantity is reached.

15. The plumbing mixing circuit control apparatus of claim 14, in which the adjustment and control circuit for determining the factors is cut in by activating the start/stop flip-flop by means of a start key, in such manner that:
  (a) an analog switch is closed by means of an AND gate, with resulting implementation of the integration process in the integrator;
  (b) simultaneously with the inception of the integration process, activation of the reset input of the integrator is effected by means of a monostable flip-flop, whereby the starting figure of the integrator is set to zero.

16. The plumbing mixing circuit control apparatus of claim 1, in which:
  (a) upon activation of a pause key the filling process can be interrupted by activation of a pause flip-flop via the AND gate such that the analog switch and hence the integration process in the integrator can be interrupted and reversed (to 0) by the control circuit and the interruption switches; and
  (b) upon re-activation of the pause key the filling process can be resumed, in such manner that upon deactivation of pause flip-flop the processes in "a" can be reversed.

17. The plumbing mixing circuit control apparatus of claim 16, in which upon activation of a start key the pause circuit can be cancelled out, the filling process begun can be halted and a new filling process can be begun, through deactivation of the pause flip-flop by means of monostable flip-flop.

18. The plumbing mixing circuit control apparatus of claim 16, in which the correction of the factor for the regulator is determinable based on the starting value of an adder, which said value corresponds to actual total flow at a given moment, whereupon the factors of the regulators can be read in the adder and in addition the corrected factor for the regulator can be computed by a function generator.

19. The plumbing mixing circuit control apparatus of claim 19 for determining the actual flow at a given moment and the cumulative filling quantity at a given moment, in which:
  (a) based on the factors of the regulators and the differential pressure ($\Delta p \mu$) between cold water inlet and mixing water outlet a value for the partial flow quantity in the cold water inlet can be derived from a differential pressure sensor by means of a function generator;
  (b) based on the factors for the regulators and the differential pressure ($\Delta p \mu$) between hot water inlet and mixing water outlet, a value for the particular flow quantity in the hot water inlet can be derived from the differential pressure sensor by means of a function generator;
  (c) a suitable value for the total flow quantity at any given moment is created by means of an adder from the partial flow quantities derived from "a" and "b"; and
  (d) the temporarily variable output signals of the adder can be totalled by means of the integrator to form a cumulative filling quantity for a given moment.

* * * * *